(12) United States Patent
Leombruno

(10) Patent No.: US 7,204,201 B2
(45) Date of Patent: Apr. 17, 2007

(54) REGULATING FEEDER FOR A HORSE

(76) Inventor: Kelly Leombruno, 9809 Bancroft Dr., Benbrook, TX (US) 76126

( * ) Notice: Subject to any disclaimer, the term of this patent is extended or adjusted under 35 U.S.C. 154(b) by 24 days.

(21) Appl. No.: 11/023,943

(22) Filed: Dec. 28, 2004

(65) Prior Publication Data

US 2006/0137617 A1   Jun. 29, 2006

(51) Int. Cl.
*A01K 61/02* (2006.01)

(52) U.S. Cl. ....................................... 119/56.1

(58) Field of Classification Search ............ 119/56.1, 119/52.1, 52.2, 53, 58
See application file for complete search history.

(56) References Cited

U.S. PATENT DOCUMENTS

| | | | |
|---|---|---|---|
| 178,697 A | 6/1876 | Winston | |
| 579,245 A | 3/1897 | Terry | |
| 3,171,385 A * | 3/1965 | Decker et al. ............ | 119/56.1 |
| 3,376,856 A | 4/1968 | Crippen | |
| 3,763,826 A | 10/1973 | Portelli | |
| 4,183,327 A | 1/1980 | Olsen | |
| 4,185,587 A | 1/1980 | Kallin | |
| 4,200,060 A | 4/1980 | Van Daele | |
| 4,235,200 A * | 11/1980 | Shay ........................ | 119/56.1 |
| 4,292,930 A | 10/1981 | Olsen | |
| 5,410,986 A * | 5/1995 | Washam .................... | 119/52.2 |
| 5,555,842 A | 9/1996 | Chocola et al. | |
| 6,135,056 A * | 10/2000 | Kuo .......................... | 119/56.2 |
| D476,451 S * | 6/2003 | Morgan, Sr. .............. | 119/52.1 |
| 6,626,128 B2 | 9/2003 | Romeu | |
| 6,637,368 B2 | 10/2003 | Bondarenko et al. | |
| 6,959,664 B1 * | 11/2005 | Keuter et al. ............. | 119/52.1 |
| 2002/0088404 A1 | 7/2002 | Romeu | |
| 2002/0124805 A1 | 9/2002 | Bondarenko et al. | |

* cited by examiner

*Primary Examiner*—Thomas Price
(74) *Attorney, Agent, or Firm*—Lynn E. Barber

(57) ABSTRACT

A regulating feeder for a horse, with a funnel shaped bottom, which may be attached to a feed delivery tube extending into the feed trough or toward a feeding surface. At the distal end of the feed delivery tube is at least one protrusion extending parallel to the axis of the feed delivery tube so that the lower end of the feed delivery tube may be positioned close to the feed trough and held away from the feed trough in the desired position. A stopper mechanism may be used to control the amount of feed that the animal may obtain.

14 Claims, 5 Drawing Sheets

REGULATING FEEDER FOR A HORSE

BACKGROUND OF THE INVENTION

1. Field of the Invention

This invention relates to the dispensing of animal feed, and in particular, to an apparatus for feeding horses.

2. Description of the Related Art

Raising horses is a major industry in the United States and around the world. Feeding horses has always presented certain management problems. Horses are often fed grain out of buckets or troughs in stalls or pastures. Many horses are aggressive at feeding time and bolt for their feed pushing it out of the feed bucket and onto the ground, while others take large mouthfuls of feed then remove their heads from the bucket, dropping large amounts of the feed on the ground.

If a horse eats feed from the ground, there is a possibility the horse will ingest dirt or foreign material along with its feed. There are a number of health risks and management problems that can occur when a horse eats feed off the ground. Feed eaten from the ground can transmit disease, cause parasite infestation and the possibility of colic or other digestive difficulties. Colic represents a serious problem, which can be fatal to the horse. In addition to the health risks to the horse, there are also economic and nutritional concerns.

Economic waste occurs when feed isn't eaten by the horse because of non-palatability, or loss to the surrounding environment, for example due to wind or rain and even dogs or rodents. Economic loss also occurs in the case of a horse having colic. This can result in high veterinary costs incurred for treatment, as well as potential loss of the horse, if the case proves fatal.

Nutritional problems arise because the animal does not receive his full ration of feed due to feed being dropped on the ground or if the feed is eaten from the ground, parasites can be introduced into the horse digestive tract. These parasites feed on the nutrition intended for the horse thereby limiting the nutrition the horse receives from his daily ration.

There are many patents for animal feeders that do not address this problem, but rather just provide a spout or a dispensing funnel and various means to drop food from the funnel on to a feeding surface, including for example, the stock feeder of Terry (U.S. Pat. No. 579,245), the automatic stock feeder of Crippen (U.S. Pat. No. 3,376,856), the horse feeding apparatus of Olsen (U.S. Pat. Nos. 4,183,327 and 4,292,930), the automatic livestock feeder of White (U.S. Pat. No. 4,284,035), the metered apparatus of Chocola et al. (U.S. Pat. No. 5,555,842), and the gated indexed feed dispensing mechanism of Bondarenko et al. (U.S. Pat. No. 6,637,368).

The related art has addressed these problems utilizing various feeder designs. One example of such a design is found in Smith, U.S. Pat. No. 5,105,769, although this design prevents the horse from pushing the feed out of the bucket, it does not however prevent the horse from bolting his feed, taking large bites of grain and removing his head from the feeder thereby dropping the feed onto the ground.

Another feeder developed by Briley, U.S. Pat. No. 5,394,832 allowed the horse to enter his head into an enclosed chamber to access his feed. This design prevents feed spillage as long as the horse does not remove his head from the feeding chamber. However horses are not comfortable not being able to see and hear their surroundings while eating. Horses are not likely to keep their head inside the chamber for the entire feeding period until their feed ration is completely consumed.

A third feeder developed by Jorden, U.S. Pat. No. 5,036,799, requires the horse to eat its ration out of a bucket which is placed outside the paddock in which the horse is housed, therefore preventing the horse from eating the dropped feed off the ground. This invention fails to address the economic loss due to feed waste.

While the automatic pet food dispenser of Portelli (U.S. Pat. No. 3,763,826) having an inclined feed board on which a funneled food container with a lower opening in one side rests to restrict food flow, this opening not only restricts the flow of food, but also prevents the animal from reaching food that has fallen directly below the dispenser due to the small opening.

None of these prior feed dispensers dispenses small manageable bites of feed in a manner easily regulated by the horse, without waste of feed, as well as being usable with current feeders.

It is therefore an object of this invention to provide a feeder that reduces both economic and nutritional loss associated with previous horse feeder designs.

It is an additional object of this invention to provide a feeder that can be utilized with any current feed trough or bucket.

It is an additional object of this invention to provide a feeder that can be used both indoors or outdoors.

It is an additional object of this invention to provide a feeder that dispenses small manageable bites of feed regulated by the horse.

Other objects and advantages will be more fully apparent from the following disclosure and appended claims.

SUMMARY OF THE INVENTION

The invention herein is a regulating feeder for a horse, comprising a feeder with a funnel shaped bottom, which is preferably attached to a feed delivery tube preferably extending into the feed trough having a feeding surface, or toward a feeding surface. At the distal end of the feed delivery tube is at least one protrusion extending parallel to the axis of the feed delivery tube so that the lower end of the feed delivery tube may be positioned close to the feed trough or other feeding surface, and held away from the feed trough in the desired position. A stopper mechanism may be used to control the amount of feed that the animal may obtain.

Other objects and features of the inventions will be more fully apparent from the following disclosure and appended claims.

DETAILED DESCRIPTION OF THE INVENTION AND PREFERRED EMBODIMENTS THEREOF

The present invention is a regulating feeder for a horse, comprising a feeder with a funnel shaped bottom, which is preferably attached to a feed delivery tube preferably extending vertically into a feed trough or toward a feeding surface. At the distal end of the feed delivery tube is at least one protrusion extending parallel to the axis of the feed delivery tube so that the lower end of the feed delivery tube may be positioned close to the feed trough and held away from the feed trough in the desired position. In the preferred embodiment, the feed delivery tube extends vertically into the feed trough. A stopper mechanism may be used to control the amount of feed that the animal may obtain.

In the preferred embodiment the feed delivery tube bottom tip opening, other than the protrusion, should be positioned above the feed surface by the protrusion about 0.5 to 2 inches, preferably 1 inch, from the feed surface to allow proper feed flow. The actual distance depends on the feed type, with a greater distance generally being used for larger feed and a smaller distance for smaller feed particles.

The protrusion(s) from the distal end of the feed delivery tube may take a variety of forms. In the preferred embodiment the protrusion is triangular, so that the feed delivery tube bottom tip is V-shaped to insure the desired distance from the feed trough is easily maintained while providing ample space for the animal to eat feed that is beneath the feed delivery tube.

In one embodiment of the invention, the feed housing can be completely funnel shaped with a protrusion as discussed herein extending from a lower opening in the feed housing, with the feed delivery tube removed and the feed housing bottom opening placed at the desired distance from the feed trough bottom to regulate feed flow.

In another embodiment of the invention, the feeder with funnel shaped bottom can be placed outside the stall with the feed delivery tube running from the outside of the stall vertically thru the stall wall semi-vertically and then vertically into the feed trough.

In another embodiment of the invention, the feed delivery tube tip can be built into the feed bucket/trough.

An additional option for any of the embodiments is the stopper ball utility, which can be used to hold feed in the feeder and prevent feed from flowing into the feed trough until a later time.

Figure 1:
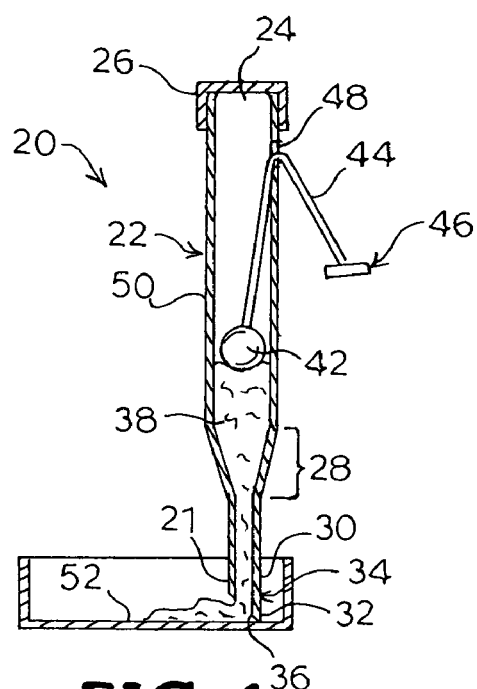
FIG. 1 is a cross-sectional side view of the preferred embodiment of the present invention. The optional stopper ball utility is shown disengaged.

Referring now in more detail to the figures, as shown in FIG. 1, the equine feeder 20 in the preferred embodiment of the present invention comprises a feed-holding bin 22 having a feeder top 24, over which is preferably placed a removable feeder lid 26. The size of feed-holding bin 22 should be large enough to hold an average horse's single feeding of grain.

Figure 6:
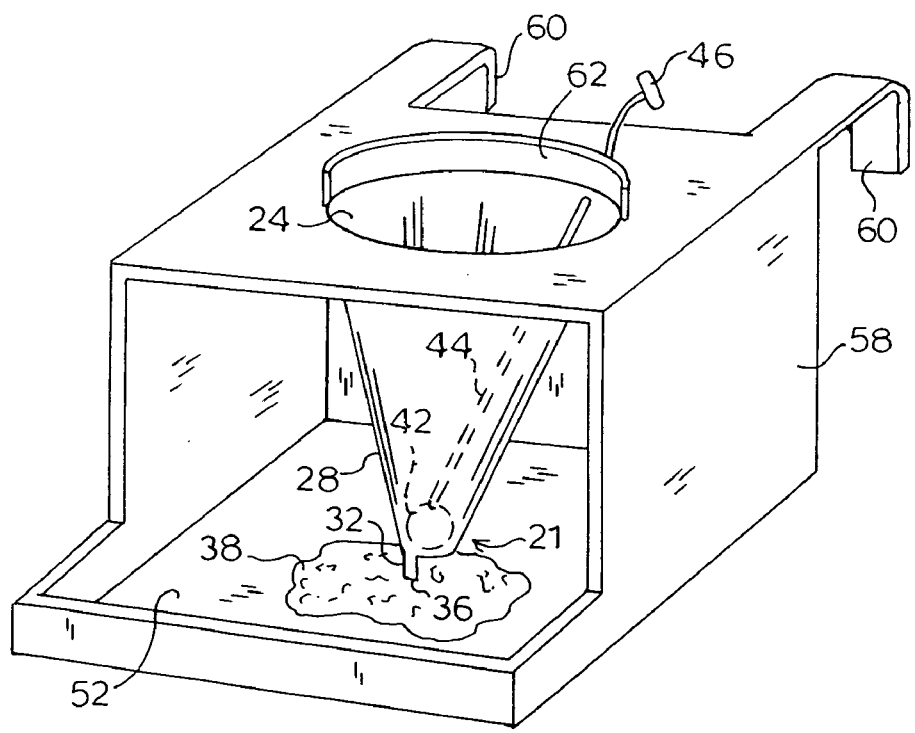
FIG. 6 is a front view of the second embodiment of the present invention, showing the funnel shaped feeder bottom as part of a complete feeding unit.

At the bottom of feed-holding bin 22 is preferably a funnel-shaped feeder bottom 28, which may be integrally formed with feed-holding bin 22 or may be a separate piece that is attached thereto. Preferably, a hollow feed delivery tube 30, extending from the bottom of bottom 28, has at least one protrusion 32 extending from the outer wall 34 of the feed delivery tube 30 parallel to the linear axis of feed delivery tube 30. In the embodiment discussed below wherein the feed is dispensed directly from the funnel-shaped feeder bottom and there is not a feed delivery tube, the protrusion 32 extends from the lower opening 31 of the bottom 28 (FIG. 6). In all embodiments, however, it is important that there be at least one protrusion extending from the feed-dispensing opening at the bottom of the feeder 20, whether it be the opening in the tube 30 or the opening in the bottom of the funnel-shaped feeder bottom 28. Further, to provide sufficient space beneath the feeder and adjacent to the protrusion(s) for the animal to feed, it is preferred that there be no protrusion on at least half of the feed-dispensing opening so that feed an be accessed beneath at least half of the feed-dispensing opening.

Although controlled access to feed as in the invention can be attained by mounting the feed-dispensing opening the correct distance above a feeding surface and not having a protrusion, jostling or wear on the feeder could result in the mounted feeder slipping downward so that the feed would not be available to the animal if there is no protrusion to hold the feeder up above the surface.

Figure 3A:
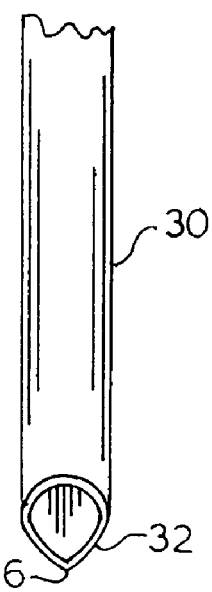
FIGS. 3A–3C shows the front, side and back views, respectively, of a V-shaped protrusion of the invention herein.
Figure 3B:
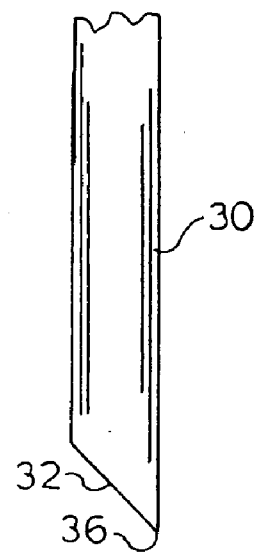
Figure 3C:
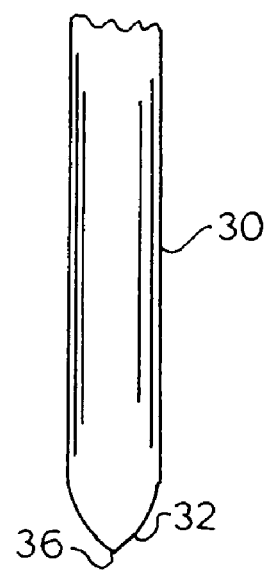
Figure 4A:
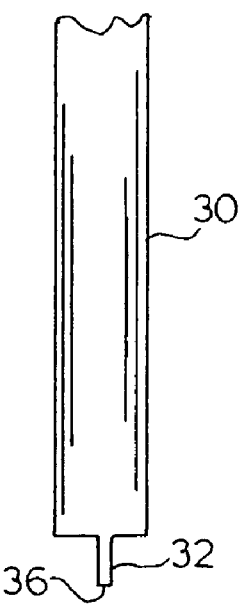
FIGS. 4A–4C shows the front, side and back views, respectively, of an I-shaped protrusion of the invention herein.
Figure 4B:
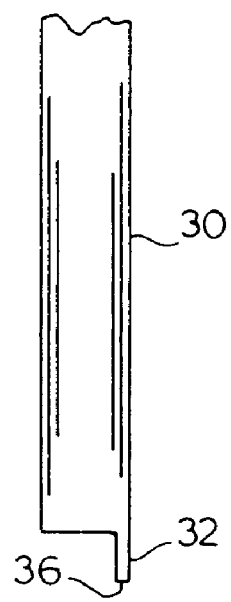
Figure 4C:
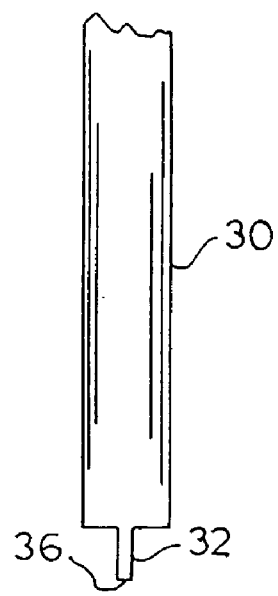
Figure 5A:
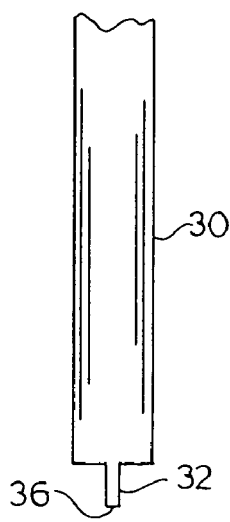
FIGS. 5A–5B shows the front and side views, respectively, of an H-shaped protrusion of the invention herein. The back view would be the same as the front view.
Figure 5B:
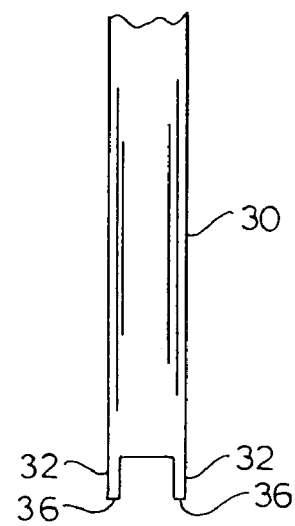

Protrusion 32 is preferably very narrow at its distal tip 36. The preferred shape of the protrusion 32 is V-shaped or triangular protrusion 32 as shown in FIGS. 3A–3C. The V-shaped tip 32 allows the horse maximum access to the delivered feed while still providing a sturdy support so that the feeder tube can rest on the feed trough or other selected feed-delivery surface. The I-shaped tip (FIGS. 4A–4C) having a single elongated rectangular protrusion is very similar to the V-shaped tip and offers the same benefits. Less preferred is the H-shaped tip 8 (FIGS. 5A–5C) having two elongated rectangular protrusions, which while allowing the horse to gather feed from the right or the left side of the feeder, is more restrictive because there is less open area beneath feed delivery tube 30.

In an optional preferred embodiment, a feed stopper ball structure is provided. The feed stopper ball structure consists of the stopper ball 42, preferably made from molded plastic, stopper ball pull-string 44, and a stopper ball pull handle 46. The stopper ball pull-string 44, which may be made of any strong material such as rope, chain, wire and the like extends from the stopper ball 42, which is inside the feed-holding bin 22, through the stopper ball pull string delivery hole 48 in the wall 50 of the feed-holding bin 22 to the outside of the feed-holding bin 22 to the stopper ball pull handle 46.

In use, as shown in FIG. 1, the stopper ball 42 is disengaged. In this position, feed 38 dumped into the feeder top 24 flows down via gravity from the feed-holding bin 22, into the funnel shaped feeder bottom 28 and then into the feed delivery tube 30 and then onto the bottom of the feed trough 52. Only a small amount of feed is exposed and available to the horse, while the remainder of the feed is backed up in the feed delivery tube 30, funnel shaped feeder bottom 28 and the feed-holding bin 22.

Figure 2:
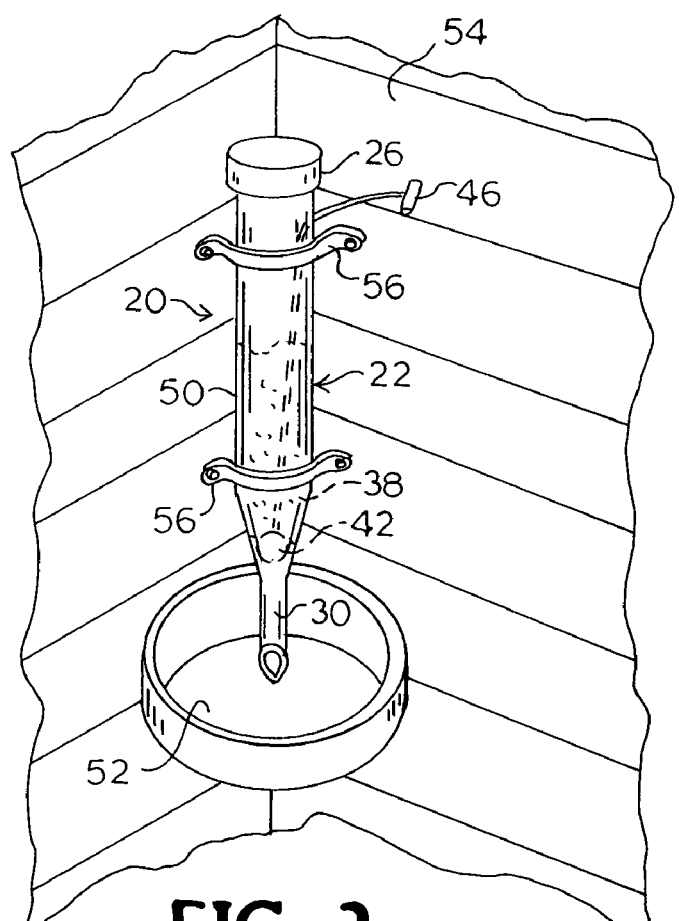
FIG. 2 is the front perspective view of the preferred embodiment of the horse feeder of the present invention, showing the feeder mounted in the corner of a stall. The optional stopper ball utility is shown engaged.

In FIG. 2 the feeder 20 is mounted to a stall wall 54 or other support structure using mounting brackets 56. The feeder 20 is placed vertically so that the bottom of the V-shaped protrusion 32 touches the bottom of the bottom of feed trough 52 and one side of the feed delivery tube 30 touches the feed trough side. This allows for maximum room for the horse to put his head in the feed trough 52. In this figure, the stopper ball 42 of the stopper ball structure is shown engaged.

FIG. 6 shows a front view of the second embodiment of the present invention, showing the funnel shaped feeder bottom 28 as part of a complete feeding unit 58, for example mounted in a hay rack, which may be held to a support such as a fence or stall by mounting hooks 60. In this embodiment, the feeder top opens through the top of the feeding unit 58, and may be covered by cover 62. The feed delivery tube is not needed since the feeder bottom opening is placed within the proper distance of the feed trough 52 and an opening space is maintained below the feeder by means of a protrusion 32 as disclosed herein extending from the feeder bottom. A stopper ball 42 may also be used in this embodiment, with the pull-string 44 extending not only through a string delivery hole 48 through the feeder 20 but also a hole or opening (not shown) in the feeding unit 58 to enable access to the pull-handle 46.

Figure 7:
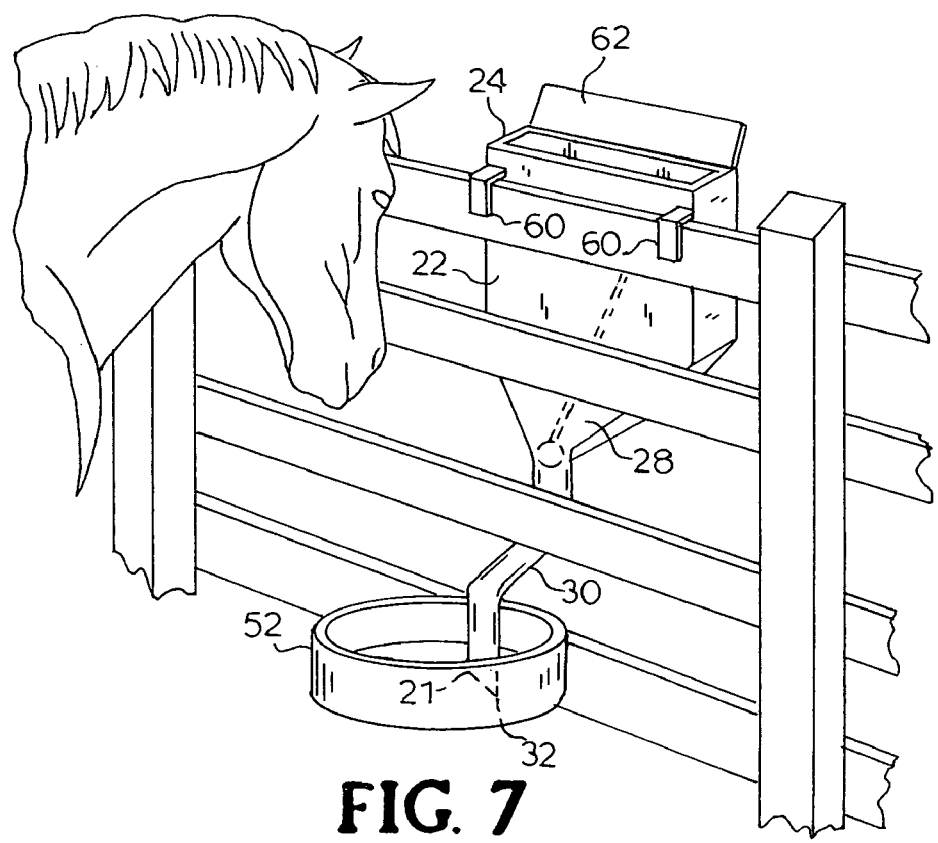
FIG. 7 is a perspective view of the third embodiment of the present invention, showing the feeder mounted on the outside of the stall wall with the feed delivery tube extending from the feed-holding bin to the feed trough.

The feeder 20 may also be mounted directly on the outside of the stall wall with the feed delivery tube extending from the feed-holding bin 22 to the trough 52 as shown in FIG. 7. In this embodiment, the feed delivery tube 30 is either formed in an S-shape or other shape to accommodate this placement, or is flexible so that it may be placed as desired. A cover 62 may be attached to the feeder top 24, hinged on either side of the top 24.

Figure 8:
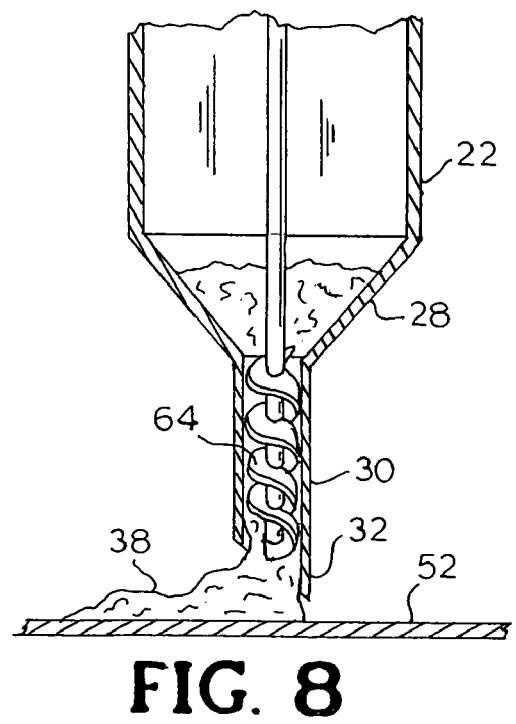
FIG. 8 is a cross-sectional view of the invention herein having a feed-moving structure therein.

An additional option for any of the embodiments is a motorized flexible auger or other feed moving structure 64 as is known in the art that extends from the feed-holding bin 22 through the feed delivery tube 30 (FIG. 8). When auger is moving, it prevents feed from becoming clogged in the feeder or feed delivery tube. This is preferably used when feeder is used to feed sweet feed and other sticky grains.

In the preferred embodiment of the invention, the feeder 20, for example, as shown in FIG. 1, is preferably of unitary construction, fabricated out of a ultra-violet (UV) ray resistant molded plastic. The manufacture of the preferred embodiment includes any of the conventional plastic techniques, including blow-molding, roto-molding, injection molding and vacuum molding. The feeder can also be fabricated out of other materials for example, stainless steel, PVC pipe or canvas. For example, 4-inch PVC pipe closed on top with a standard PVC cap and a funnel of PVC coupling down to a 2-inch diameter feed delivery tube may be used. This feeder can be used with any type feed trough or feed bucket, provided it allows the horse to get his head in and out freely. A shallow feed trough with a 2 or 3-inch rim works the best.

The feeder may also be made in multiple parts, for example, a funnel portion of plastic, PVC, canvas or other material, having a lower collar or flange or other means known in the art to attach the funnel portion to a feed delivery tube of plastic, PVC or other material.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A regulating feeder having a top and a bottom, the feeder comprising:
   a) a feed-holding bin having a funnel-shaped bottom, a linear axis, and a lower opening;
   b) a protrusion attached to the bottom of the feeder, the protrusion having a tip and extending parallel to the linear axis,
   c) wherein the feeder is used by placing the feed-holding bin above a feeding surface with the linear axis aligned vertically with the tip of the protrusion touching the feeding surface so that the feeder is held in position above the feeding surface, and adding feed to the top of the feeder, wherein feed discharged from the feed holding bin is regulated in small amounts depending on the length of the protrusion, which length determines the distance the feed delivery tube is from the feeding surface.

2. The regulating feeder according to claim 1, wherein the protrusion is attached to the lower opening of the feed-holding bin.

3. The regulating feeder according to claim 2, wherein the protrusion is triangular.

4. The regulating feeder according to claim 2, further comprising a stopper ball structure.

5. The regulating feeder according to claim 1, further comprising a feed delivery tube attached to a lower opening of the funnel-shaped bottom, wherein the protrusion is attached to the feed delivery tube.

6. The regulating feeder according to claim 5, wherein the protrusion is triangular.

7. The regulating feeder according to claim 5, further comprising a stopper ball structure.

8. The regulating feeder according to claim 1, wherein the feeder is mounted on a support structure.

9. The regulating feeder according to claim 1, further comprising a feed-moving structure within the feeder.

10. A regulating feeder having a top and a bottom, the feeder comprising:
    a) a feed-holding bin having a funnel-shaped bottom, a linear axis, and a lower opening:
    b) a rectangular protrusion attached to the bottom of the feeder at the lower opening of the feed-holding bin, the protrusion having a tip and extending parallel to the linear axis,
    wherein the feeder is used by placing the feed-holding bin above a feeding surface with the linear axis aligned vertically with the tip of the protrusion touching the feeding surface so that the feeder is held in position above the feeding surface, and adding feed to the top of the feeder.

11. The regulating feeder according to claim 10, wherein there are two rectangular protrusions.

12. The regulating feeder according to claim 10, wherein the protrusion is 0.5 to 2 inches long.

13. 9. A regulating feeder having a top and a bottom, the feeder comprising:
    a) a feed-holding bin having a funnel-shaped bottom, a linear axis, and a lower opening;
    b) a feed delivery tube attached to the lower opening of the funnel-shaped bottom;
    c) a rectangular protrusion attached to the feed delivery tube, the protrusion having a tip and extending parallel to the linear axis,
    wherein the feeder is used by placing the feed-holding bin above a feeding surface with the linear axis aligned vertically with the tip of the protrusion touching the feeding surface so that the feeder is held in position above the feeding surface, and adding feed to the top of the feeder.

14. The regulating feeder according to claim 13, wherein there are two rectangular protrusions.

* * * * *